US008868578B2

(12) United States Patent
Ashley et al.

(10) Patent No.: US 8,868,578 B2
(45) Date of Patent: Oct. 21, 2014

(54) BUILDING INFORMATION TECHNOLOGY SERVICES FROM A LIBRARY OF ELEMENTS

(75) Inventors: Peter Ashley, Melbourne (AU); Michael John Brady, St. Leonards (AU); Frank Patrick Krause, Williamstown (AU); Vishwa Ranjan, Pune (IN); Gandhi Sivakumar, Melbourne (AU)

(73) Assignee: International Business Machines Corporation, Armonk, NY (US)

( * ) Notice: Subject to any disclaimer, the term of this patent is extended or adjusted under 35 U.S.C. 154(b) by 550 days.

(21) Appl. No.: 12/894,430

(22) Filed: Sep. 30, 2010

(65) Prior Publication Data

US 2012/0084327 A1    Apr. 5, 2012

(51) Int. Cl.
*G06F 17/30* (2006.01)
*G06F 9/44* (2006.01)

(52) U.S. Cl.
CPC ........................................ *G06F 8/36* (2013.01)
USPC .......................................................... 707/756

(58) Field of Classification Search
USPC .................................................. 707/755, 756
See application file for complete search history.

(56) References Cited

U.S. PATENT DOCUMENTS

| | | | |
|---|---|---|---|
| 7,287,037 B2 | 10/2007 | An et al. | |
| 7,797,282 B1 * | 9/2010 | Kirshenbaum et al. | 707/651 |
| 2002/0199031 A1 * | 12/2002 | Rust et al. | 709/315 |
| 2005/0050298 A1 | 3/2005 | Joseph | |
| 2005/0050311 A1 | 3/2005 | Joseph et al. | |
| 2006/0074975 A1 * | 4/2006 | Tunar et al. | 707/103 X |
| 2007/0073769 A1 * | 3/2007 | Baikov et al. | 707/104.1 |
| 2007/0294704 A1 * | 12/2007 | Stephen et al. | 719/315 |
| 2008/0046484 A1 * | 2/2008 | Ellis et al. | 707/204 |
| 2008/0127047 A1 | 5/2008 | Zhang et al. | |

FOREIGN PATENT DOCUMENTS

WO    WO2006/099046 A2    9/2006

OTHER PUBLICATIONS

Arsanjani, Ali, et al. "SOMA: A method for developing service-oriented solutions." IBM systems Journal 47.3 (2008): 377-396.*
Jacobson, Ivar. "Object-oriented development in an industrial environment." ACM SIGPLAN Notices. vol. 22. No. 12. ACM, 1987.*
Mayer, Philip, Andreas Schroeder, and Nora Koch. "Mdd4soa: Model-driven service orchestration." Enterprise Distributed Object Computing Conference, 2008. EDOC'08. 12th International IEEE. IEEE, 2008.*
Radhakrishnan, Rakesh, "Model Driven Architecture Enabling Service Oriented Architectures," Sun Microsystems white paper, Mar. 2004.

* cited by examiner

*Primary Examiner* — Usmaan Saeed
*Assistant Examiner* — Nan Hutton
(74) *Attorney, Agent, or Firm* — Anthony V S England; John Pivnichny; Mark Vallone

(57) ABSTRACT

Source entities with initially predefined properties for service modeling are presented in a library for user selection as service modeling entities. An automated computer process expediter copies user selected ones of the source entities from the library into a computer readable storage medium providing a services layer. The copying generates instances in the services layer of the selected service modeling source entities, such that the services layer instances at least initially include the initially predefined properties of their respective source entities. The automated computer process expediter maintains the properties of the selected ones of the source entities, including maintaining the selected source entities' properties independently of changes made in a first change mode to the properties of the service modeling entity instances, which are in the services layer, so that the user may change the properties of the layer service modeling instances.

15 Claims, 7 Drawing Sheets

BUILDING INFORMATION TECHNOLOGY SERVICES FROM A LIBRARY OF ELEMENTS

TECHNICAL FIELD

The present invention relates generally to building information technology services using libraries of model elements, and, more particularly, to controlling relations among model elements and services built from those elements.

DESCRIPTION OF RELATED ART

In information technology, models exist that provide a consistent definition and structure of data using object oriented techniques. Such models define elements for use by management applications in an information technology environment. In defining such elements as objects, the models provide definitions of object classes, properties, methods and associations. This facilitates a shared understanding that enables management of the elements independent of their source.

One such model is the Common Information Model (CIM), for which Open CIM standards have been published by the TeleManagement Forum, the Distributed Management Task Force, and others. While CIM can be leveraged from Industry published standards, other models exist and still others may yet be defined, as well.

SUMMARY OF THE INVENTION

The present disclosure provides a method, apparatus, and computer program product for building information technology services in a computer system.

In one aspect, a computer system includes at least one microprocessor and memory, the memory having instructions for execution by the one or more microprocessors.

The instruction execution for building information technology services from a library includes presenting source entities in a library for user selection as service modeling entities. The source entities have initially predefined properties for service modeling. An automated computer process copies user selected ones of the source entities from the library into a computer readable storage medium providing a services layer.

The copying generates instances in the services layer of the selected service modeling source entities, such that the services layer instances at least initially include the initially predefined properties of their respective source entities.

The automated computer process maintains the properties of the selected ones of the source entities. This includes maintaining the selected source entities' properties independently of changes made in a first change mode to the properties of the service modeling entity instances, which are in the services layer. This way, the user may change the properties of the layer service modeling instances.

If this change is in the first change mode, which keeps source entities independent of service layer instances, the selected source entities continue to be available in library with their respective initially predefined properties for still more user selection as service modeling entities.

Regarding maintaining independence of the selected source entities' properties, this includes the automated computer process populating a table. Populating the table includes generating respective entries in the table, which links source entities in the library to their respective service modeling entity instances in the services layer.

Responsive to a user change, the automated computer process changes a service modeling entity instance, in the services layer and records the change in the table 454 entry for the source entity from which the changed services layer instance was originally copied.

If the changing is in the first mode, the automated computer process maintains the predefined properties of the source entity unchanged in the library. If the changing is in a second mode, the automated computer process changes the properties in the library of the source entity to match changed properties in the services layer of the changed service modeling entity instance.

Methods and computer program products providing aspects of the above-summarized features are also described and claimed herein.

BRIEF DESCRIPTION OF THE DRAWINGS

Novel features of this disclosure are set forth in the appended claims. These features, as well as advantages and a preferred mode of use thereof, will best be understood by reference to the following Detailed Description of one or more illustrative embodiments of the invention, particularly when read in conjunction with the accompanying figures, wherein:

DETAILED DESCRIPTION OF THE PREFERRED EMBODIMENT

Figure 1:
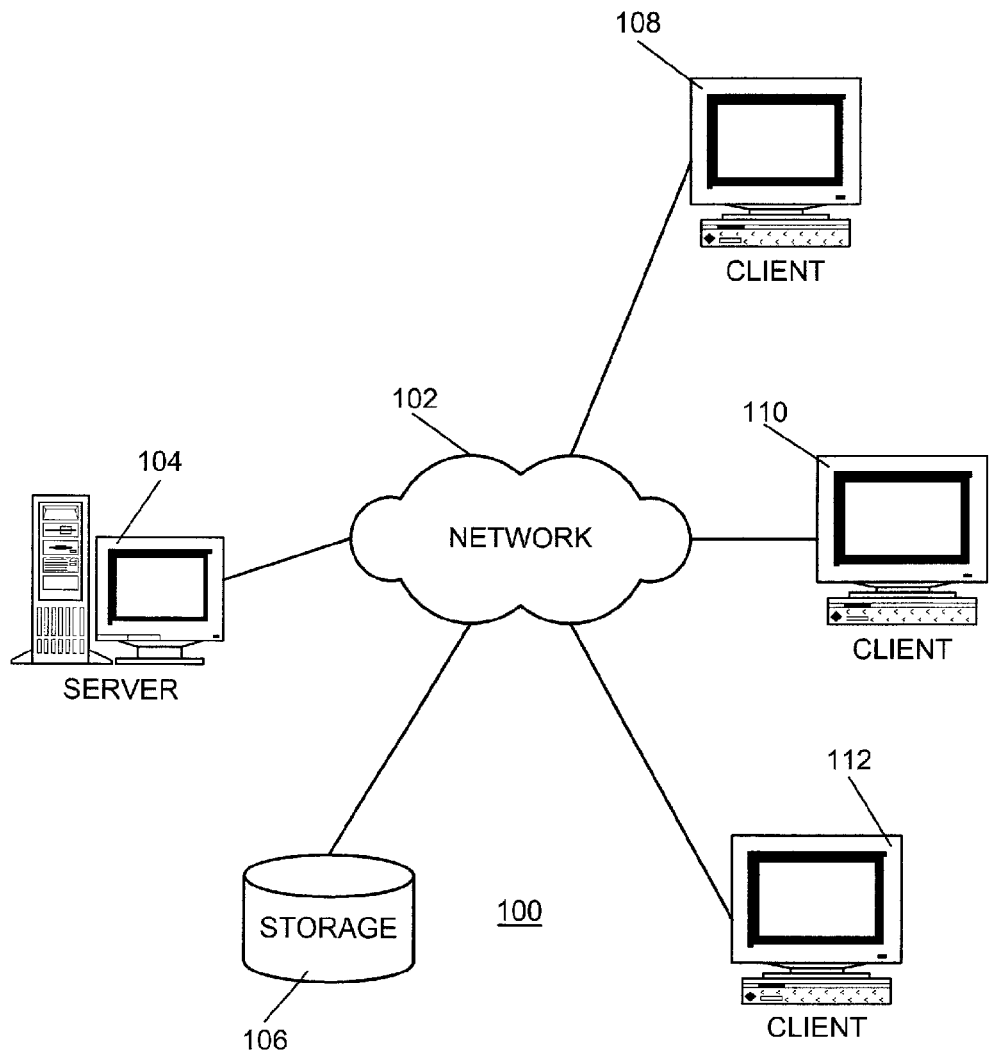
FIG. 1 depicts a pictorial representation of a network of data processing systems in which the present invention may be implemented.

FIG. 1 depicts a pictorial representation of a network of data processing systems (also referred to as "computer systems") in which the present invention may be implemented. Network data processing system 100 is a network of computer systems in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, one of the computer systems, server 104, is connected to network 102 along with storage unit 106. In addition, other computer systems, clients 108, 110, and 112, are depicted and are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another.

At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
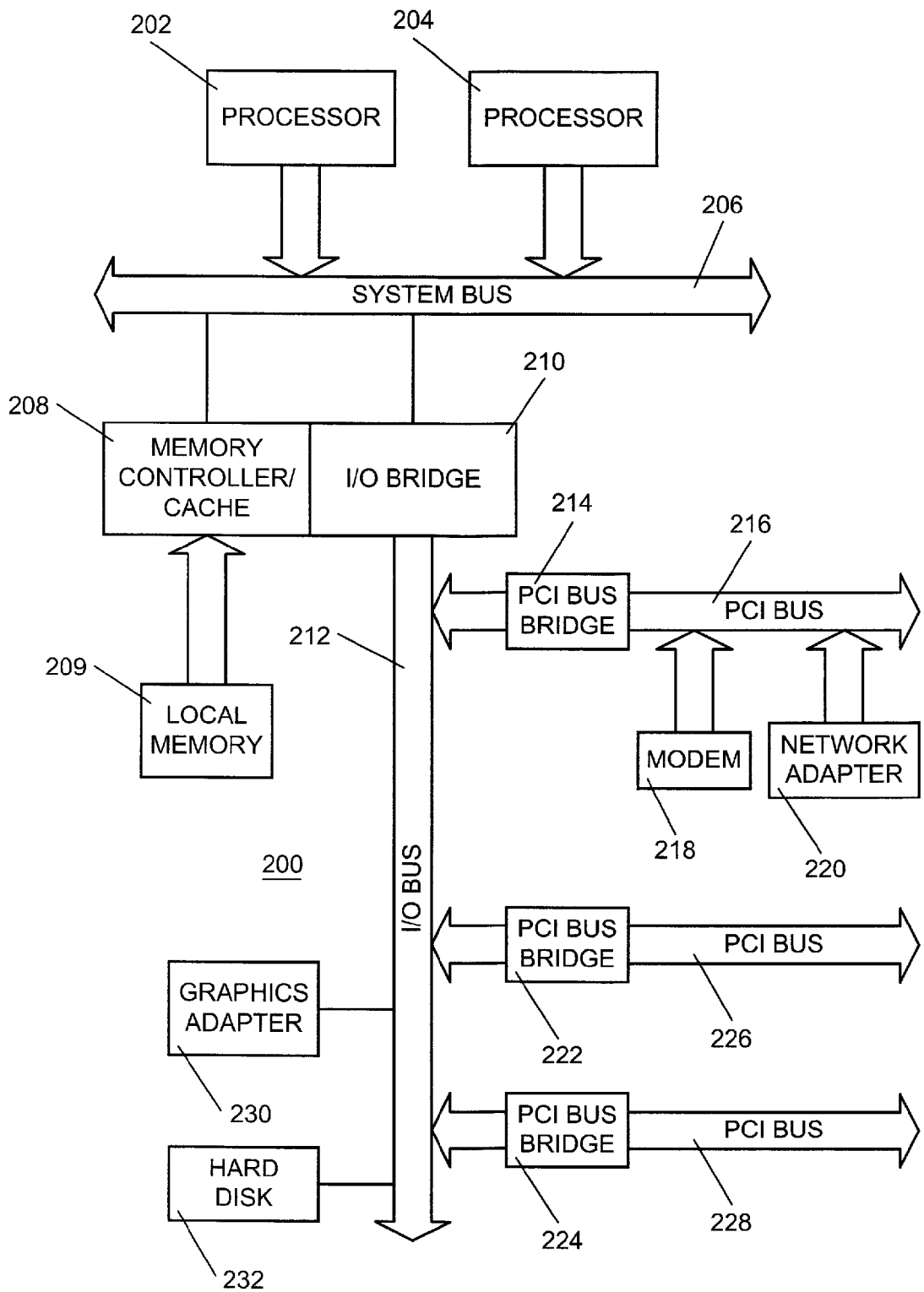
FIG. 2 is a block diagram of a data processing system that may be implemented as a server in which the present invention may be implemented.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of microprocessors 202 and 204 connected to system bus 206. Alternatively, a single microprocessor system may be employed. Also connected to system bus 206 is memory controller/cache 208, which provides an interface to local memory 209. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-server p series system, a product of International Business Machines Corporation in Armonk, N.Y., running the Advanced Interactive Executive (AIX) operating system or LINUX operating system. (AIX is a registered trademark of International Business Machines Corporation.)

Figure 3:
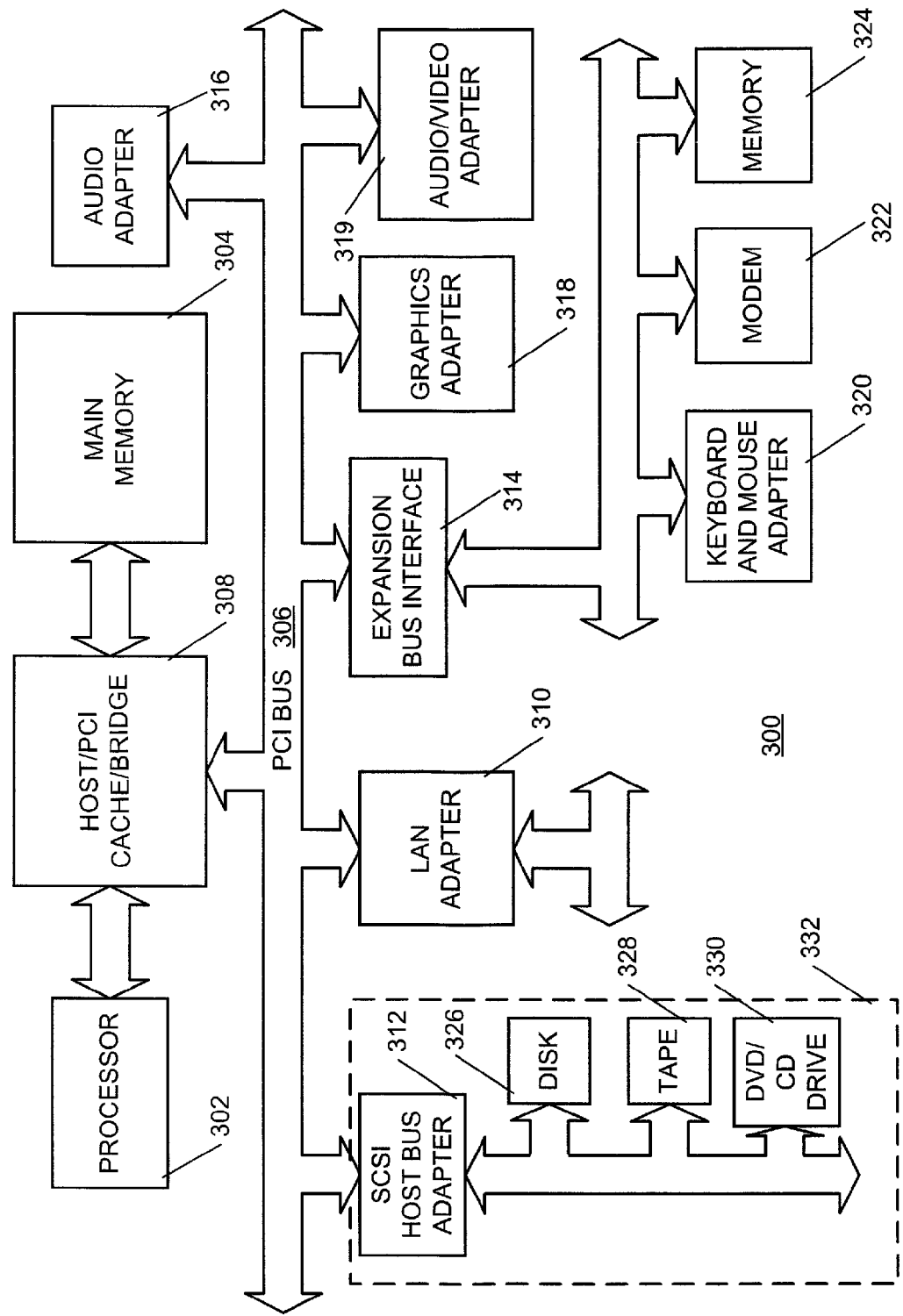
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Microprocessor 302 and main memory 304 are connected to PCI local bus 306 through PCI Bridge 308. PCI Bridge 308 also may include an integrated memory controller and cache memory for microprocessor 302. Additional connections to PCI local bus 306 may be made through direct component interconnection or through add-in boards. In the depicted example, local area network (LAN) adapter 310, small computer system interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on microprocessor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by microprocessor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. In addition, the processes of the present invention may be applied to a multiprocessor data processing system.

As another example, data processing system 300 may be a stand-alone system configured to be bootable without relying on some type of network communication interfaces. As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a kiosk, Web appliance, laptop, notebook, netbook, tablet or hand held computer or other mobile computerized device . . . .

In models such as CIM, objects may be used in providing services according to a service oriented architecture (SOA), which is a way of interfacing applications that may be implemented on widely disparate platforms and that are often Web based. In an SOA context, application functions are separated into distinct services accessible over a network according to well-defined protocols. That is, according to an SOA, not only do services and their users exchange data in a well-defined, mutually understood format, but there are often network accessible, machine-readable descriptions of the operations of the services in a well-defined, mutually understood format. These service descriptions facilitate automated discovery of SOA-based services.

Further, publishers of CIM standards have also published CIM models for services applying to commonly-managed devices and software. (A device or software may be referred to herein as a "resource.") This allows a user, such as an administrator, to manage a modeled resource by enabling the user to merely interact with the model of the resource according to well-defined services, such that the user does not have to deal with specifics of how to communicate with the resource itself, since the model interacts with the real resource. SOA also facilitates combining and reusing functions in the production of applications.

In CIM-based, SOA development projects, CIM elements are created and maintained in a CIM library, also referred to herein as a "CIM layer." These elements may be embodied in respective XML documents, to give one example. In a specification process, during which a model is created for a particular service, the developer defines (i.e., models) the service using instances of the library's CIM elements, which the developer copies from the library.

In this context, a service's definition may directly provide its implementation in a manner such as the following, for example. For a computer program to communicate with a CIM-XML defined service, for example, the service representation must be transformed into program code. This may be done by an automated binder that maps the service definition XML elements to members of a class to be represented in computer memory. Computer system processing of this program code prior to or at runtime loads objects in computer memory representing the operations defined in the XML elements (which may be in an XML document or documents). This allows the program to access the XML data in the memory-resident object created from XML elements of the CIM-based model, rather than accessing the one or more XML documents themselves.

Further, because of the need to publish mutually understood, machine-readable descriptions of the CIM-XML elements that are in the library in order to maintain interoperability, a process of a development tool may automatically conform CIM-XML elements in the library to corresponding instances of those CIM-XML elements that the developer copied for the service model, such as responsive to changes made by the developer to copied CIM-XML elements in the CIM layer during the model specification process.

The above described correspondences between library, resource definition and implementation may present issues regarding development of a service, during which time a service's built-in CIM objects become exposed. For example, a developer may change a copy of a CIM element in the CIM layer for one service, such as to delete irrelevant attributes. This may automatically change the corresponding source CIM element which is also in the CIM layer, i.e., library, as described herein above. However, the developer may then wish to use the original CIM element from the library to define another service, but the original one will no longer exist due to the automatic conformance of the source CIM element in the library to the copied CIM element. Thus, a developer may be driven to avoid changes to copies of CIM elements in order to preserve the source CIM elements.

For example, a developer may choose not to delete irrelevant attributes from a CIM element due to the above described issue. This may result in exposure of the irrelevant attributes during service implementation (termed herein as a "CIM forced view"), which, in turn, increases memory occupancy and maintenance from a service provider perspective. Irrelevant attributes may also cause bloated traffic during initial document exchange (between a service provider and a consumer) after service discovery. Further, exposing irrelevant attributes may impose security issues in some cases. And exposure of irrelevant attributes may confuse consumers. Additionally, it requires design and maintenance effort to specify and maintain each attribute on each CIM element.

Thus a tension exists. As described herein, this tension is addressed by providing a CIM conformant SOA ("CCS") layer, or simply "services layer," in addition to, and decoupled from, the library, i.e., CIM layer. This loose coupling arrangement disclosed herein enables robust service specifications, as explained below. This is in contrast to an arrangement in which the CIM and SOA reside in the same layer and in which the behavior of the CIM elements in the library must be the same as the corresponding copies of CIM elements that define services in the same layer.

Figure 4A:
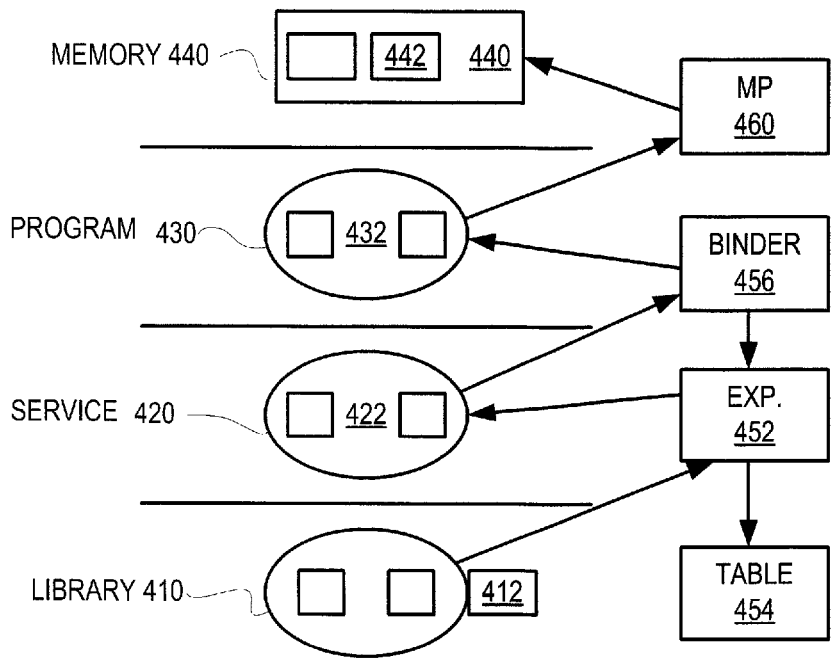
FIG. 4A is a block diagram illustrating certain data elements, objects, processes and hardware aspects of a computer system, in accordance with one or more embodiments of the present invention.

According to an embodiment of the invention, an "SOA expediter for CIM" (or, more simply, an "expediter") is provided, shown as expediter 452 herein in FIG. 4A. Expediter 452 may, in one form, be provided as, or may include, a plug-in residing in a software tool such as Rational Software Architecture (RSA), WebSphere Integration Developer (WID) or Service Oriented Modeling and Architecture (SOMA) 3.x. Expediter 452 performs actions to provide logical separation of the CIM and service layers.

In one aspect, expediter 452 copies CIM entities 412 from library 410 into a services layer 420. In an embodiment of the invention, CIM entities 412 in library 410 may be presented by a graphical user interface, and the copying by expediter 452 may be responsive to a developer dragging graphically depicted CIM entity icons 412 from the graphically depicted library 410 during a service specification process. During the model specification process, the developer may modify entities 422 in services layer 420.

According to an aspect of an embodiment of the present invention, corresponding entities 412 in library 410 are maintained in their original state, i.e., without being updated to correspond to any changes made to entities 422 in services layer 420. In order to maintain a record of relationships between entities 422 in services layer 420 and their original, unmodified source entities 412 in library 410, expediter 452 populates a CIM-to-Service table 454 with entries for entities 412 selected by the developer from library 410 and copied to services layer 420 during the model specification process. Expediter 452 links table 454 entries to associated entities 412, but decouples them in at least one mode of use, wherein in the decoupled mode the changes a developer makes to copies (in layer 420) of entities 412 are maintained in layer 420 independently of, i.e., not incorporated into, entities 412 in library 410. Before run time the developer initiates an automated binding process, in which expediter 452 locks, i.e., commits, the entries expediter 452 has recorded for CIM entities 422 in CIM-to-Service table 454. In this way a record persists of entities 422 and their relation to the corresponding entities 412 in library 410.

In another aspect, once a developer completes a service model, such that completed CIM-XML entities 422 of the model reside in services layer 420, the developer may then initiate binding, wherein binder 456 performs automated processing of CIM-XML entities 422, thereby implementing a service interface by generating program code 432 in program layer 430, which maps entities 422 to members of a class. Computer system processor 460 processing of program code 432 in program layer 430 produces objects 422 in computer memory 440 representing the operations defined in elements 422 in services layer 420. This may be done by the binding process, which is prior to runtime. In another embodiment of the invention, this may be done by some other process, which is also prior to runtime. In another embodiment of the invention, this may be done by a process during runtime.

The above described processing is done at a service operation request and response level. That is, for example, an OrderManagement service may have more than one operation, such as operations like CreateOrder, ModifyOrder, etc. Each operation may have a request or response, such as CreateOrderRequest or CreateOrderResponse, for example. An instance of a single CIM object from a CIM library may be used in the services layer for more than one such request or more than one response. That is, the single CIM object in the library may have multiple instances in the services layer for different requests or responses. Consequently, the single CIM library object may need to behave differently in its respective services layer instances, and therefore may have different attributes. Thus, the above described processing is done at a service operation request and response level.

Figure 5:
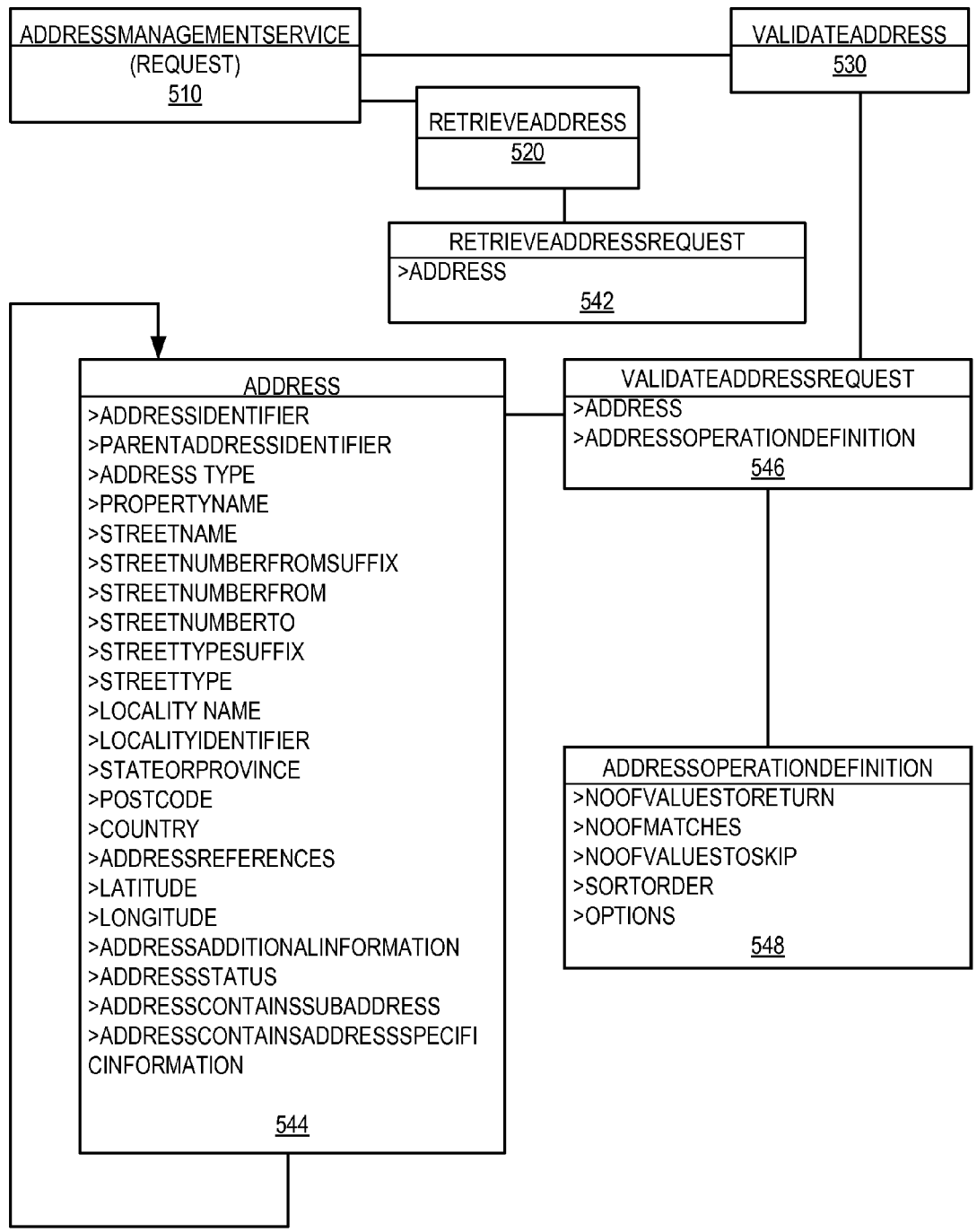
FIG. 5 is a block diagram illustrating a requesting service, in accordance with one or more embodiments of the present invention.
Figure 6:
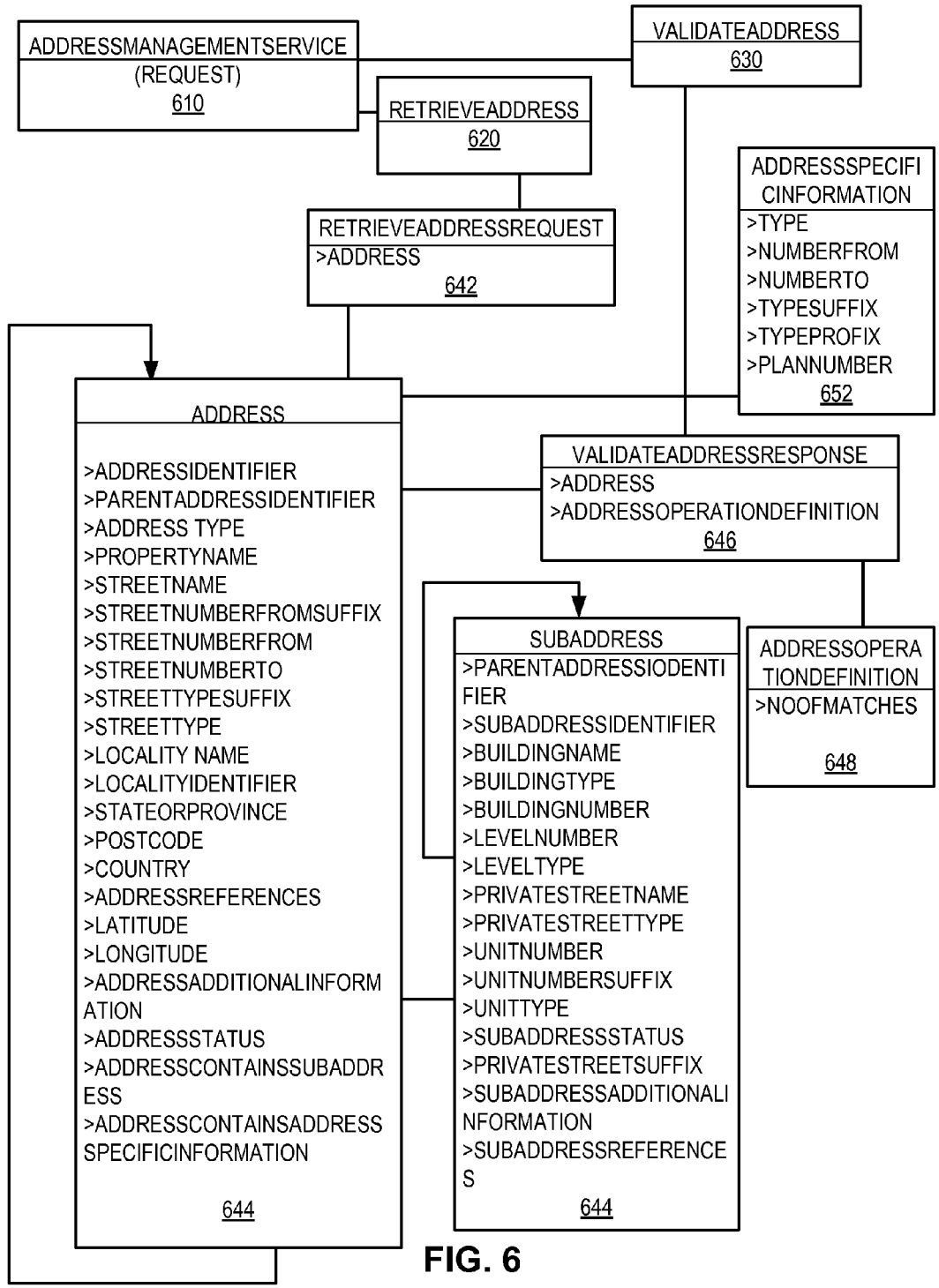
FIG. 6 is a block diagram illustrating a responding service, in accordance with one or more embodiments of the present invention.

These matters are further illustrated in the examples described herein below in connection with several figures. Consider the example service, AddressManagement Service (request) 510 as shown in FIG. 5, which includes two request operations, RetrieveAddress 520 and ValidateAddress 530, according to an embodiment of the invention. Consider also the example service, AddressManagementService (response) 610 as shown in FIG. 6, which includes two similar service operation responses, RetrieveAddress 620 and ValidateAddress 630, according to an embodiment of the invention.

Figure 4B:
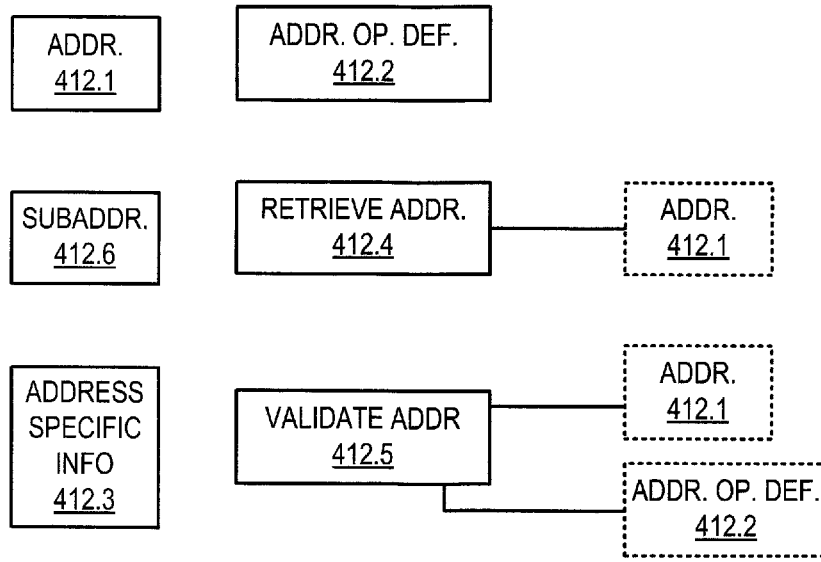
FIG. 4B is a block diagram illustrating data elements in a library of FIG. 4A, in accordance with one or more embodiments of the present invention.

Referring now to FIGS. 4B and 5, responsive to a developer dragging a representation of RetrieveAddress element 412.4 from library 410 to service layer 420 for building service operation AddressManagementService (request) 510, expediter 452 automatically instantiates operation RetrieveAddress (request) 520 in service layer 420. Since RetrieveAddress element 412.4 has been defined by library 410 developer to include Address element 412.1, expediter 452 automatically instantiates RetrieveAddress element 412.4 and Address element 412.1 in service layer 420 as RetrieveAddressRequest object 542 and associated Address object 544. Expediter 452 records the association and the linkage to the source object as an entry in table 454 for AddressManagementService (Request), as shown below.

| Table for AddressManagementService (Request) |
|---|
| Retrieve Address 412.4 => Retrieve AddressRequest 542 |
| Address 412.1 => Address 544 |

Likewise, responsive to the developer dragging a representation of ValidateAddress element 412.5 from library 410 to service layer 420 for building AddressManagementService (request) 510, expediter 452 automatically instantiates service operation ValidateAddress (request) 530 in service layer 420. Since ValidateAddress element 412.5 has been defined by library 410 developer to include AddressOperationDefinition 412.2 elements, expediter 452 automatically instantiates ValidateAddress element 412.5 in service layer 420 as ValidateAddressRequest object 546 and automatically instantiates AddressOperationDefinition element 412.2 in service layer 420 as associated AddressOperationDefinition object 548. Since ValidateAddress element 412.5 has been defined by library 410 developer to also include Address 412.1, expediter 452 also automatically instantiates an association in service layer 420 between ValidateAddressRequest object 546 and Address object 544, given that Address object 544 is already in service layer 420 for the same service 510. Expediter 452 records the associations and linkages to source objects as additional entries in table 454 for AddressManagementService (Request), as shown below.

| Table for AddressManagementService (Request) |
|---|
| Retrieve Address 412.4 => Retrieve AddressRequest 542 |
|    Address 412.1 => Address 544 |
| ValidateAddress 412.5 => ValidateAddressRequest 546 |
|    Address 412.1 => Address 544 |
|    AddressOperationDefinition 412.5 => AddressOperationDefinition 548 |

Referring now to FIGS. 4B and 6, responsive to a developer dragging a representation of RetrieveAddress element 412.4 from library 410 to service layer 420 for building AddressManagementService (response) 610, expediter 452 automatically instantiates RetrieveAddress operation 620 in service layer 420. RetrieveAddress element 412.4 includes Address element 412.1, so expediter 452 automatically instantiates them as RetrieveAddressRequest object 642 and associated Address object 644 in service layer 420. Expediter 452 records the associations and linkages to source objects as entries in table 454 for AddressManagementService (Response), as shown below.

| Table for AddressManagementService (Response) |
|---|
| Retrieve Address 412.4 => Retrieve AddressResponse 642 |
|    Address 412.1 => Address 644 |

Since the developer wants RetrieveAddressResponse object 642 (unlike RetrieveAddressRequest object 542) to also include associations (via Address object 644) to SubAddress object 650 and AddressSpecificInformation object 646, the developer also drags representations of SubAddress element 412.6 and AddressSpecificInformation element 412.3 from library 410 to service layer 420, whereupon expediter 452 responsively instantiates them in service layer 420. Then the developer specifies the associations between SubAddress object 650 and Address object 644, and between AddressSpecific-Information object 646 and Address object 644. Expediter 452 maintains this change independent of RetrieveAddress element 412.4 in library 410, i.e., does not change RetrieveAddress element 412.4 in library 410 to include associations (via Address element 412.1) to SubAddress element 412.6 and AddressSpecificInformation element 412.3. However, expediter 452 does generate additional entries in table 454 for AddressManagementService (Response) as shown below to record the associations between SubAddress object 650 and Address object 644, and between AddressSpecific-Information object 646 and Address object 644 and to record linkage to the corresponding source objects.

| Table for AddressManagementService (Response) |
|---|
| Retrieve Address 412.4 => Retrieve AddressResponse 642 |
|    Address 412.1 => Address 644 |
|       SubAddress 412.6 => SubAddress 650 |
|       AddressSpecificInformation 412.3 => AddressSpecificInformation 652 |

Likewise, responsive to the developer dragging a ValidateAddress element 412.5 from library 410 to service layer 420 for building AddressManagementService (response) 610, expediter 452 automatically instantiates ValidateAddress operation 630 in service layer 420. Since ValidateAddress element 412.5 has been defined by library 410 developer to include AddressOperationDefinition element 412.2, expediter 452 automatically instantiates AddressOperationDefinition element 412.2 in service layer 420 as ValidateAddressResponseobject 646 and associated AddressOperationDefinition object 648. Since ValidateAddress element 412.5 has been defined by library 410 developer to also include Address 412.1, expediter 452 automatically instantiates an association between ValidateAddressRequestobject 546 and Address object 644 in service layer 420, given that Address object 644 is already in service layer 420 for the same service 610. Expediter 452 also generates additional entries in table 454 for AddressManagement Service (Response) as shown below to record the association of ValidateAddressResponse object 646 with Address object 644 and AddressOperationDefinitionobject 648 and to record linkage to the corresponding source objects.

| Table for AddressManagementService (Response) |
| --- |
| Retrieve Address 412.4 => Retrieve AddressResponse 642 |
|    Address 412.1 => Address 644 |
|       SubAddress 412.6 => SubAddress 650 |
|       AddressSpecificInformation 412.3 => |
|       AddressSpecificInformation 652 |
| ValidateAddress 412.5 => ValidateAddressResponse 646 |
|    Address 412.1 => Address 644 |
|    AddressOperationDefinition 412.2 => AddressOperationDefinition 648 |

When the developer is ready to commit objects for AddressManagement Service (request) 510 and AddressManagementService (response) 610 in service layer 420, the developer initiates binding process 456 which automatically refers to table 454 and thereby determines objects and associations that have been added or removed by the developer compared to entities 412 in library 410, such as, for example, the addition of SubAddress object 650 and AddressSpecificInformation object 646 and their associations with Address object 644, as described herein above.

It should be appreciated that in another exemplary instance, RetrieveAddress element 412.4 in library 410 may include associations with SubAddress element 412.6 and AddressSpecificInformation element 412.3 in addition to Address element 412.1, such that the developer may build the AddressManagementService (response) 610 shown in FIG. 6 simply by dragging RetrieveAddress element 412.4 to service layer 420. In such an instance, the developer may then build the AddressManagementService (request) 510 shown in FIG. 5 by dragging RetrieveAddress element 412.4 to service layer 420 and deleting objects and related associations that expediter 452 automatically instantiates from SubAddress element 412.6 and AddressSpecificInformation element 412.3. In this case, expediter 452 generates entries in table 454 to record deletions instead of additions as in the example first described herein above, in which RetrieveAddress element 412.4 in library 410 does not include associations with SubAddress element 412.6 and AddressSpecific Information element 412.3. (Once again, expediter 452 maintains this change to RetrieveAddress—Response 642 in service layer 420 independently of RetrieveAddress element 412.4 in library 410, unless the developer directs expediter 452 to do otherwise.)

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be supplied to a processor of a general purpose computer, special purpose computer, or other programmable data processing apparatus, such that the processor and instructions provide a machine that implements functions and actions specified in the one or more flowchart or block diagram herein. The processor of a general purpose computer, special purpose computer, or other programmable data processing apparatus may be referred to herein as a "microprocessor." However, the term "microprocessor" should not be interpreted as being limited to a single-chip processing unit, unless explicitly so stated.

These computer program instructions may also be stored in a computer readable medium that can direct a computer, other programmable data processing apparatus, or other devices to function in a particular manner, such that the instructions stored in the computer readable medium produce an article of manufacture including instructions which implement any function or action specified in the one or more flowchart or block diagram herein. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing any function or action specified in the one or more flowchart or block diagram herein.

Figure 7:
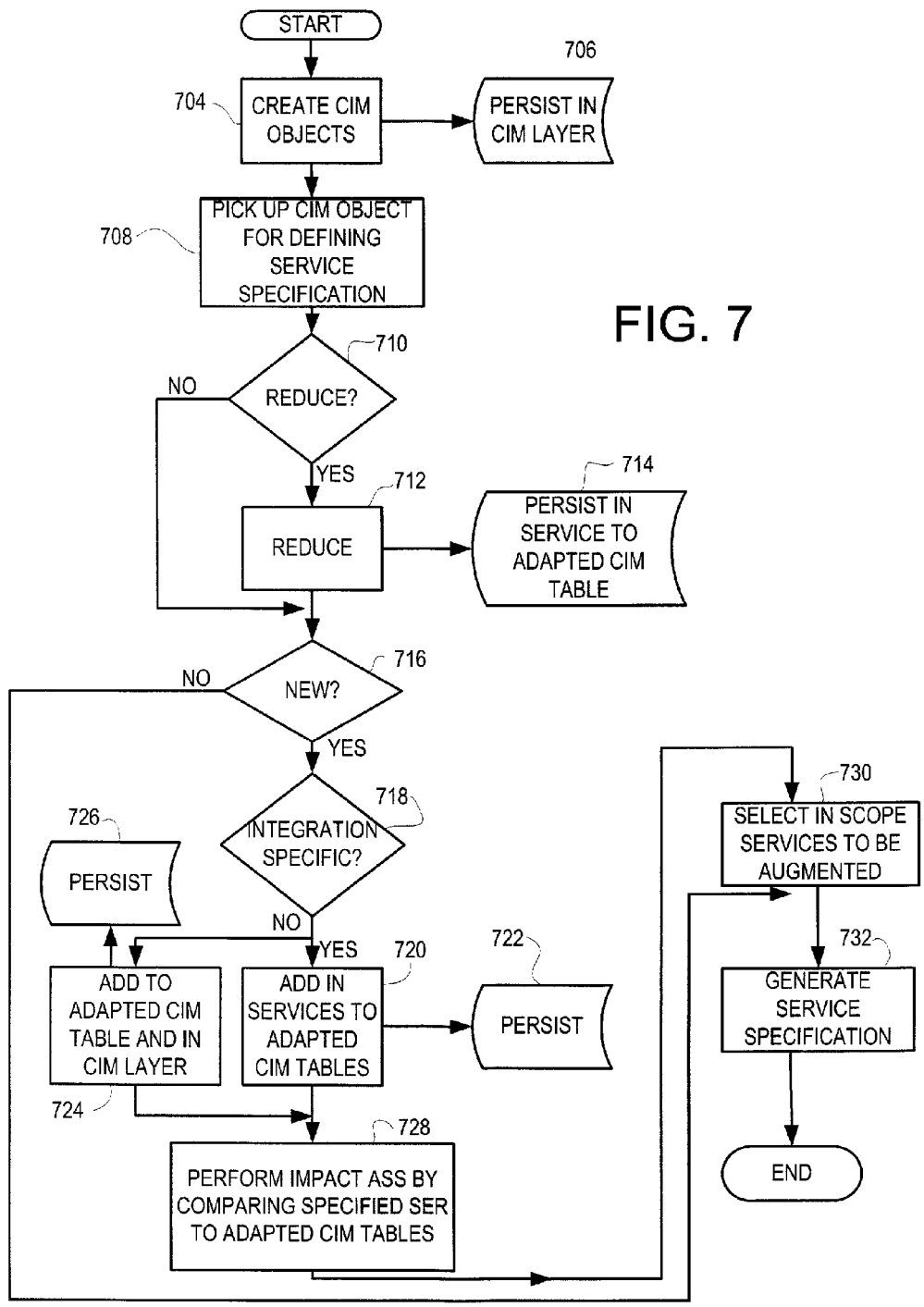
FIG. 7 is a flow chart illustrating one or more processes for building and maintaining services, in accordance with one or more embodiments of the present invention.

Referring now to FIG. 7, a flowchart is shown for an automated computer process 700 involved in creating CIM objects in service layer 420 (FIG. 4A) for generating a service specification and using them in program layer 430 (FIG. 4A).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

At block 704, a developer interacts with the computer process to create CIM objects (also referred to herein as "elements") and to save them (block 706) in a library stored in a computer readable storage medium. Then, at 708, a developer defines a service specification (also referred to herein as defining a "model" for a service) by interacting with computer process 700 to copy a CIM object from the library to a service layer. This interaction may be via a graphical user interface, in which the user controls a mouse to direct process 700 to pick up and drag an icon for the CIM object from a representation of the library and then drop the icon into a representation of the service layer.

Process 700 deals with the object dropped into the service layer in order to create a service specification, as follows. At 710, process 700 prompts the user to either "reduce," i.e., delete one or more attributes from, the object or not. Responsive to the user selecting to delete (710:yes), process 700 deletes the one or more attributes at 712 and creates and stores (714) an entry for the object in an adapted CIM table, which indicates the remaining one or more attributes of the new service. Responsive to the user selecting not to delete (710: no), process 700 skips to block 716.

At 716, process 700 prompts the user to either add one or more new attributes to the object or not. Responsive to the user selecting to not add (716:no), process 700 branches to block 732, where it generates a service specification for the current object, i.e., generates program code for the object.

Responsive to the user selecting one or more new attributes to add (716:yes), then process 700, at 718, prompts the user to indicate whether or not the current object is merely integration specific. If the user indicates that the current object is merely integration specific (718:yes), then process 700 creates an entry for the object (720) and stores the entry (722) in an adapted CIM table, which indicates the attributes of the new service. If the user indicates that the current object is more globally significant, i.e., not merely integration specific, (718:no), then process 700 not only creates an entry for the current object for the adapted CIM table, but also creates a change for the corresponding CIM object in the library (724) and stores these changes (726). That is, for the current object, which has one or more attributes that have been changed at 712 or 716 in comparison to the CIM object originally selected at 708, process 700 causes (724) and stores (726) an update to attributes in the library for the originally selected CIM object.

Then, at 728, process 700 prompts the user to compare the current object, which has been modified at 712 or 716 and for which an entry has currently been added in the service layer to the CIM table, to other such existing objects and their attributes, which have already been added to the table. After this, the user communicates (730) to process 700 any selected changes to those existing objects, whereupon process 700 augments (730) those selected objects, which process 700 does in the same fashion as shown in blocks 710-726. Thereafter, as previously described, the computer process generates (732) a service specification for the current object.

The processes described herein may be provided by a GUI based plug-in that provides additional class stereotypes and palettes enabling the designer to obtain CIM objects from the library to define service messages. A robust service design is enabled by the processing of CIM objects as provided by the plug-in, which includes logical separation of the CIM and service layers. When CIM elements are copied from a library, attributes may be specified at a service operation level, which enables more independence among services, permitting creation of a more robust service interface. As the developer reconfigures CIM objects in the service layer, the expediter updates a CIM table that maps objects in the service layer relative to their corresponding model elements in the library, so that an implementation of the service specification may derive both from model elements in the library and objects in the service specification layer that have been adapted from those model elements.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. An automated method for building information technology services from a library, comprising:
   presenting source entities in a model layer library for user selection during development of a computer program as service modeling entities, wherein the source entities have initially predefined properties for service modeling in a markup language;
   prompting a user to indicate whether a first change mode or a second change mode applies;
   an automated computer process copying user selected ones of the source entities from the model layer library into a computer readable storage medium providing a services layer during the development of the computer program, wherein the copying generates instances in the services layer of the selected service modeling source entities, such that the services layer instances at least initially include, in a markup language, the initially predefined properties of their respective source entities;
   an automated computer process generating, in a binding operation, computer program code in a program layer from one or more of the instances in the services layer, wherein the binding operation includes, responsive to user selection of the first change mode, maintaining the properties of the selected ones of the source entities, including maintaining the selected source entities' properties independently of changes made in the first change mode to the properties of the service modeling entity instances in the services layer, so that the user may change the properties of the service layer service modeling instances, wherein if the change is in the first change mode, the selected source entities continue to be available in the model layer library with their respective initially predefined properties for still more user selection as service modeling entities, wherein responsive to user selection of the second change mode the automated computer process changes the selected source entities to match changed properties in the services layer of the changed service modeling entity instances; and
   an automated computer process generating one or more objects for runtime execution from the program layer program code.

2. The method of claim 1, wherein maintaining independence of the selected source entities' properties includes:
   the automated computer process populating a table, wherein populating the table includes generating respective entries in the table.

3. The method of claim 2, comprising:
   linking, via the entries in the table, source entities in the library to their respective service modeling entity instances in the services layer.

4. The method of claim 3, comprising:
   responsive to a user change, the automated computer process changing a service modeling entity instance in the services layer and recording the change in the table entry for the source entity from which the changed services layer instance was originally copied.

5. The method of claim 3, comprising:
   changing a first service modeling entity instance in the services layer by including properties of a second service modeling entity instance among the properties of the first service modeling entity instance.

6. A computer system comprising:
   a computer readable storage medium; and
   at least one microprocessor, the computer readable storage medium having instructions for execution by the at least one microprocessor;
   wherein the computer system is configured with the instructions and the at least one microprocessor to build information technology services from a library, wherein the building comprises:
   presenting source entities in a model layer library for user selection as service modeling entities during development of a computer program, wherein the source entities have initially predefined properties for service modeling in a markup language;
   prompting a user to indicate whether a first change mode or a second change mode applies;
   an automated computer process copying user selected ones of the source entities from the model layer library into a computer readable storage medium providing a services layer during the development of the computer program, wherein the copying generates instances in the services layer of the selected service modeling source entities, such that the services layer instances at least initially include, in a markup language, the initially predefined properties of their respective source entities;
   an automated computer process generating, in a binding operation, computer program code in a program layer from one or more of the instances in the services layer, wherein the binding operation includes, responsive to user selection of the first change mode, maintaining the properties of the selected ones of the source entities, including maintaining the selected source entities' properties independently of changes made in the first change mode to the properties of the service modeling entity instances, so that the user may change the properties of the service layer service modeling instances, wherein if the change is in the first change mode, the selected source entities continue to be available in the model layer library with their respective initially predefined properties for still more user selection as service modeling entities, wherein responsive to user selection of the second change mode the automated computer process changes the selected source entities to match changed properties in the services layer of the changed service modeling entity instances; and
   an automated computer process generating one or more objects for runtime execution from the program layer program code.

7. The computer system of claim 6, wherein maintaining independence of the selected source entities' properties includes:
   the automated computer process populating a table, wherein populating the table includes generating respective entries in the table.

8. The computer system of claim 7, wherein the building comprises:
   linking, via the entries in the table, source entities in the library to their respective service modeling entity instances in the services layer.

9. The computer system of claim 8, wherein the building comprises:
   responsive to a user change, the automated computer process changing a service modeling entity instance in the services layer and recording the change in the table entry for the source entity from which the changed services layer instance was originally copied.

10. The computer system of claim 8, wherein the building comprises:

changing a first service modeling entity instance in the services layer by including properties of a second service modeling entity instance among the properties of the first service modeling entity instance.

11. A computer readable storage medium having an executable program stored thereon, wherein the program instructs at least one microprocessor to build information technology services from a library, wherein the building of the services comprises:

presenting source entities in a model layer library for user selection as service modeling entities during development of a computer program, wherein the source entities have initially predefined properties for service modeling in a markup language;

prompting a user to indicate whether a first change mode or a second change mode applies;

an automated computer process copying user selected ones of the source entities from the model layer library into a computer readable storage medium providing a services layer during the development of the computer program, wherein the copying generates instances in the services layer of the selected service modeling source entities, such that the services layer instances at least initially include, in a markup language, the initially predefined properties of their respective source entities; and an automated computer process generating, in a binding operation, computer program code in a program layer from one or more of the instance in the services layer, wherein the binding operation includes, responsive to user selection of the first change mode, maintaining the properties of the selected ones of the source entities, including maintaining the selected source entities' properties independently of changes made in the first change mode to the properties of the service modeling entity instances in the services layer, so that the user may change the properties of the service layer service modeling instances, wherein if the change is in the first change mode, the selected source entities continue to be available in the model layer library with their respective initially predefined properties for still more user selection as service modeling entities, wherein responsive to user selection of the second change mode the automated computer process changes the selected source entities to match changed properties in the services layer of the changed service modeling entity instances; and an automated computer process generating one or more objects for runtime execution from the program layer program code.

12. The computer program product of claim 11, wherein maintaining independence of the selected source entities' properties includes:

the automated computer process populating a table, wherein populating the table includes generating respective entries in the table.

13. The computer program product of claim 12, wherein the building of the services comprises:

linking, via the entries in the table, source entities in the library to their respective service modeling entity instances in the services layer.

14. The computer program product of claim 13, wherein the building of the services comprises:

responsive to a user change, the automated computer process changing a service modeling entity instance in the services layer and recording the change in the table entry for the source entity from which the changed services layer instance was originally copied.

15. The computer program product of claim 14, wherein the building of the services comprises:

changing a first service modeling entity instance in the services layer by including properties of a second service modeling entity instance among the properties of the first service modeling entity instance.

* * * * *